US007744137B2

(12) United States Patent
Mazyck

(10) Patent No.: US 7,744,137 B2
(45) Date of Patent: Jun. 29, 2010

(54) PAGE TURNING DEVICE

(76) Inventor: Darren Mazyck, 5830 NW. 30th Ave., Miami, FL (US) 33142

( * ) Notice: Subject to any disclaimer, the term of this patent is extended or adjusted under 35 U.S.C. 154(b) by 130 days.

(21) Appl. No.: 11/467,646

(22) Filed: Aug. 28, 2006

(65) Prior Publication Data

US 2008/0079276 A1 Apr. 3, 2008

(51) Int. Cl.
*B65G 7/12* (2006.01)

(52) U.S. Cl. .......................................................... 294/25

(58) Field of Classification Search .................. 294/25; 2/21, 221

See application file for complete search history.

(56) References Cited

U.S. PATENT DOCUMENTS

| | | | | | |
|---|---|---|---|---|---|
| 888,976 | A | | 5/1908 | Duperhault | |
| 942,003 | A | * | 11/1909 | Marsh | 294/25 |
| 1,844,507 | A | | 2/1932 | Gifford | |
| 2,077,540 | A | * | 4/1937 | Welker | 294/25 |
| 2,600,647 | A | * | 6/1952 | Hauser | 294/25 |
| 2,717,799 | A | | 9/1955 | Jones | |
| 3,985,383 | A | * | 10/1976 | Yonkers | 294/25 |
| 4,763,940 | A | | 8/1988 | Held | |
| 4,908,881 | A | * | 3/1990 | Field | 2/21 |
| 5,640,713 | A | * | 6/1997 | Ping | 2/21 |
| 5,735,544 | A | | 4/1998 | Buckner | |
| 5,772,268 | A | | 6/1998 | Chabrier | |
| 6,121,366 | A | | 9/2000 | Sharma | |
| 6,128,778 | A | * | 10/2000 | Castagneri | 2/21 |
| 6,409,059 | B1 | | 6/2002 | Calvert | |
| 6,589,544 | B2 | | 7/2003 | Leong | |
| 6,726,068 | B2 | | 4/2004 | Miller | |
| 6,839,905 | B1 | * | 1/2005 | Bruder et al. | 2/21 |
| 6,918,137 | B2 | * | 7/2005 | Fowler | 2/16 |

* cited by examiner

*Primary Examiner*—Paul T Chin
(74) *Attorney, Agent, or Firm*—Fleit Gibbons Gutman Bongini & Bianco PL; Paul D. Bianco; Martin Fleit

(57) ABSTRACT

A page turning device positionable on a finger tip of a wearer includes a finger sleeve of elastomeric material configured to be fitted onto the finger. A pad is affixed to the sleeve or incorporated into the sleeve, and includes a tacky outer surface configured to capture and lift a paper for movement thereof.

7 Claims, 6 Drawing Sheets

PAGE TURNING DEVICE

FIELD OF THE INVENTION

The present invention relates to a device for use in the handling of paper products and more specifically, to a device to assist in the turning of book or magazine pages, the sorting or separating of stacks of paper, money, and the like.

BACKGROUND OF THE INVENTION

In the handling of paper the finger tip plays an integral role in the turning pages of books, magazines or coloring books, handling flash cards or playing cards. The paper is moved by a frictional force interacting between the paper the finger tip, where the finger tip applies a compressive force to the paper to engage the paper.

However, where large volumes of papers are to be handled the finger can become easily fatigued. This can be especially true in banking, clerical, and secretarially work. Furthermore, individuals with limitations in the use of fingers, hands or arms frequently encounter problems performing this simple act.

A number of devices have been developed which can aid a wearer in the handling of papers. U.S. Pat. No. 942,003 discloses a finger pad which is worn on the finger tip of a wearer and can be used to create an increased friction between the finger and the paper. Similarly, U.S. Pat. No. 2,717,799 discloses a plastic finger pad that is especially designed for use by bank tellers and other. However, these devices still require the application of a compressive force to the paper.

SUMMARY OF THE INVENTION

The present invention provides a page turning device positionable on a finger tip of a wearer. The page turning device includes a finger sleeve configured to be fitted onto the finger tip of the wearer. A pad base is positioned on a lower portion of the finger sleeve, where a pad is affixed to the pad housing. The pad includes a tacky outer surface configured to capture a paper for movement thereof.

The pad can be made of a flexible, elastic material such as a plastic material having a high plasticizer content or a thermoplastic elastomer having a high coefficient of friction such that the outer surface of the pad is tacky.

In a method of use, the page turning device is positioned on the finger tip of the wearer, where the pad is positioned over a lower surface of the finger tip. The tacky outer surface of the pad is used to engage a page, wherein the tacky outer surface is sufficiently tacky to lift, i.e. turn the paper. To disengage the page turn device from the page, the finger is rotated about its longitudinal axis, such that the tacky outer surface of the pad is rolled off of the paper.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
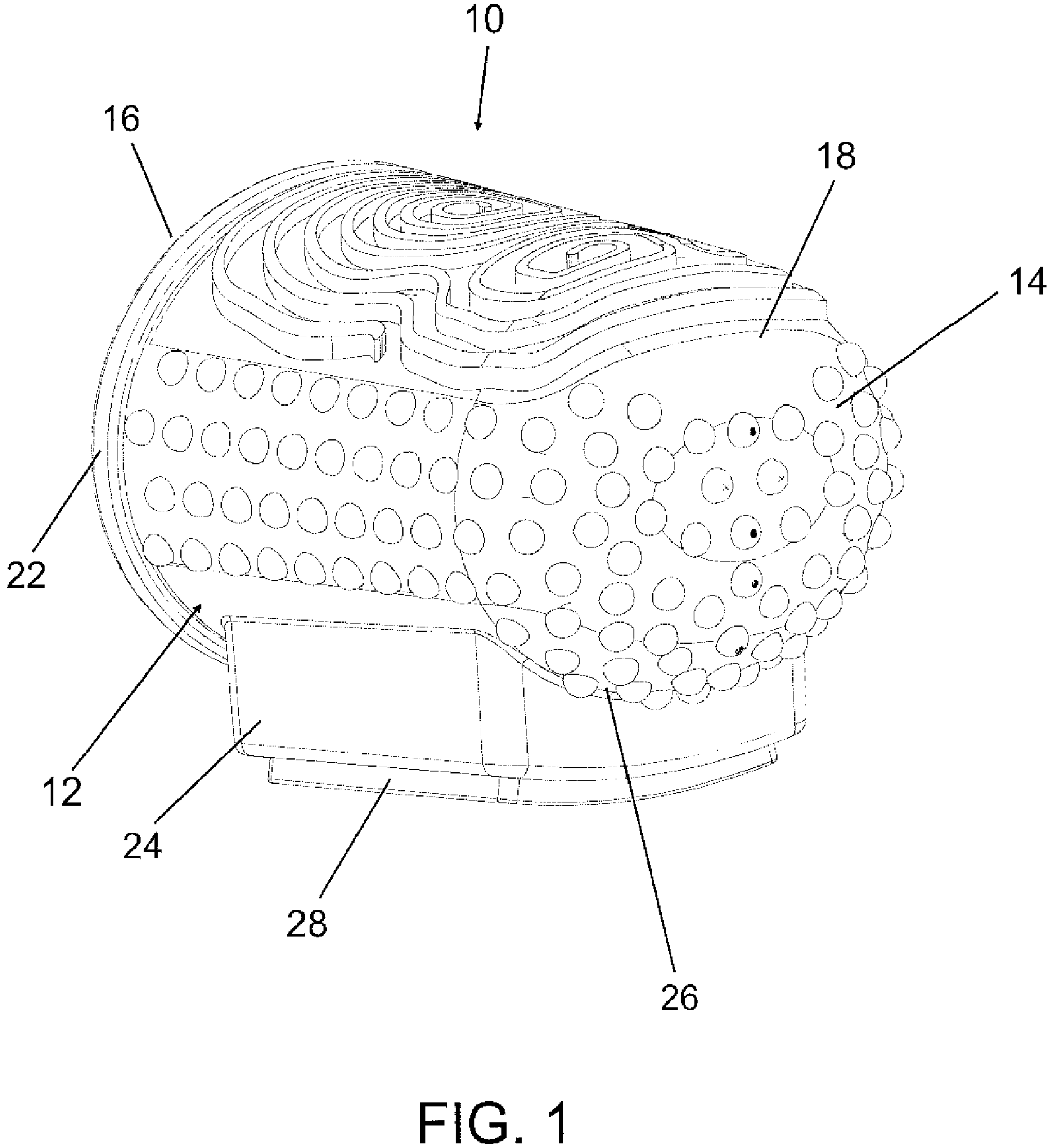
FIG. 1 depicts a front perspective view of the page turning device of the present invention.
Figure 2:
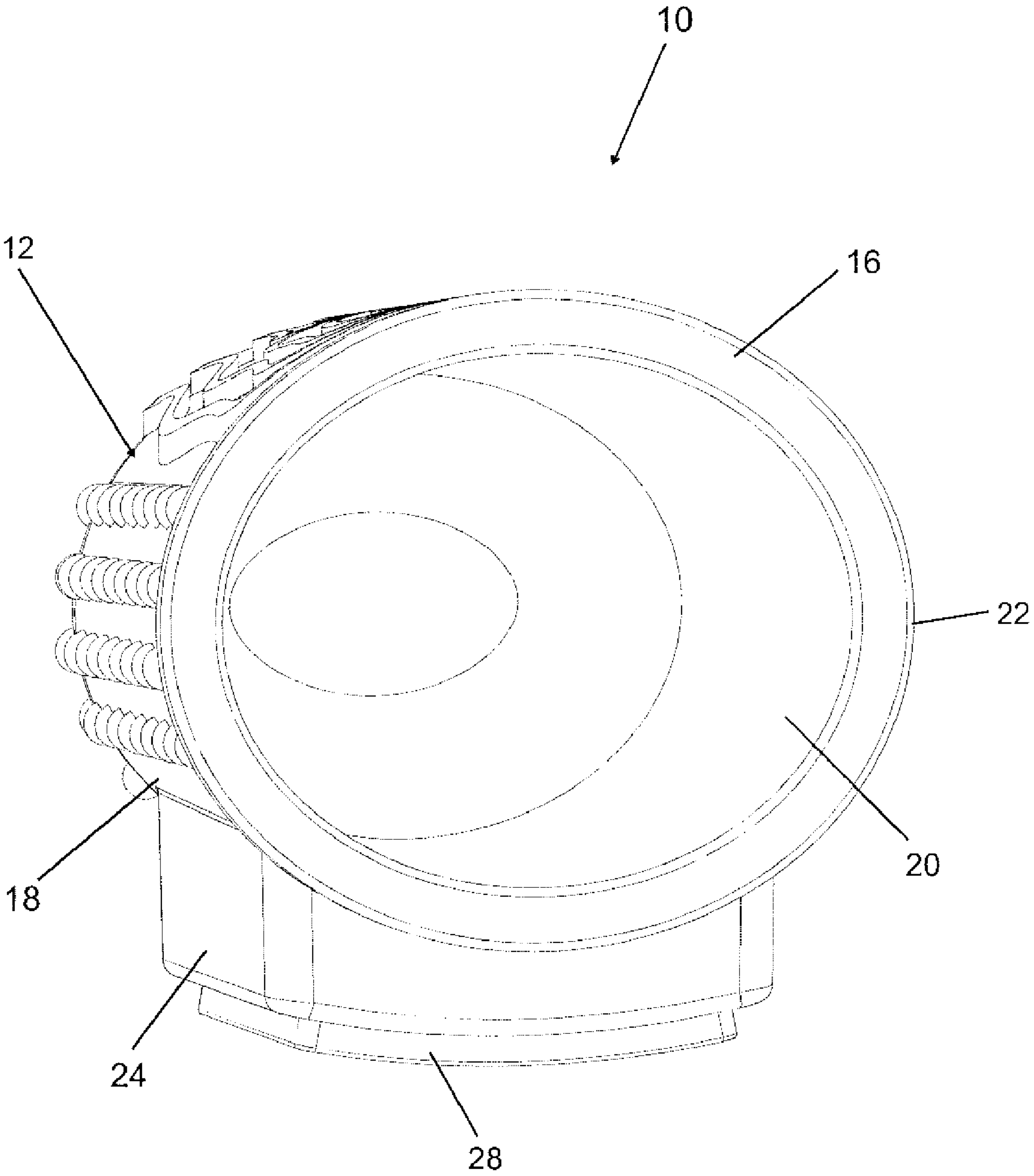
FIG. 2 depicts a rear perspective view of the page turning device of FIG. 1.

Referring now to the drawing figures in which like reference designators refer to like elements, there is shown in FIGS. 1 and 2 a pager turning device 10 of the present invention. The page turning device 10 includes a finger sleeve 12 having a first closed, curved, end 14 and an opposite, open end 16. The finger sleeve 12 further includes an outer surface 18 and an inner surface 20 defining an interior space therein, such that the finger sleeve 10 is configured to be fitted about a finger tip of a wearer. The open end 16 can include a lip portion 22, providing an increased rigidity to the open end 16. The finger tip of the wearer is positioned though the open end 16, into the interior space, to proximally abut the inner surface 20 of the closed end 14, where the inner surface 20 substantially conforms about the finger tip of the wearer.

While the finger sleeve 12 is disclosed has having an first closed, curved end 14, it is contemplated that the first end 14 can be a first open end. To facilitate placement of the finger sleeve 12 on the finger tip, the first open end can have a diameter less then the diameter of open end 16, thus limiting placement of the finger sleeve 12 to the finger tip.

Figure 3:
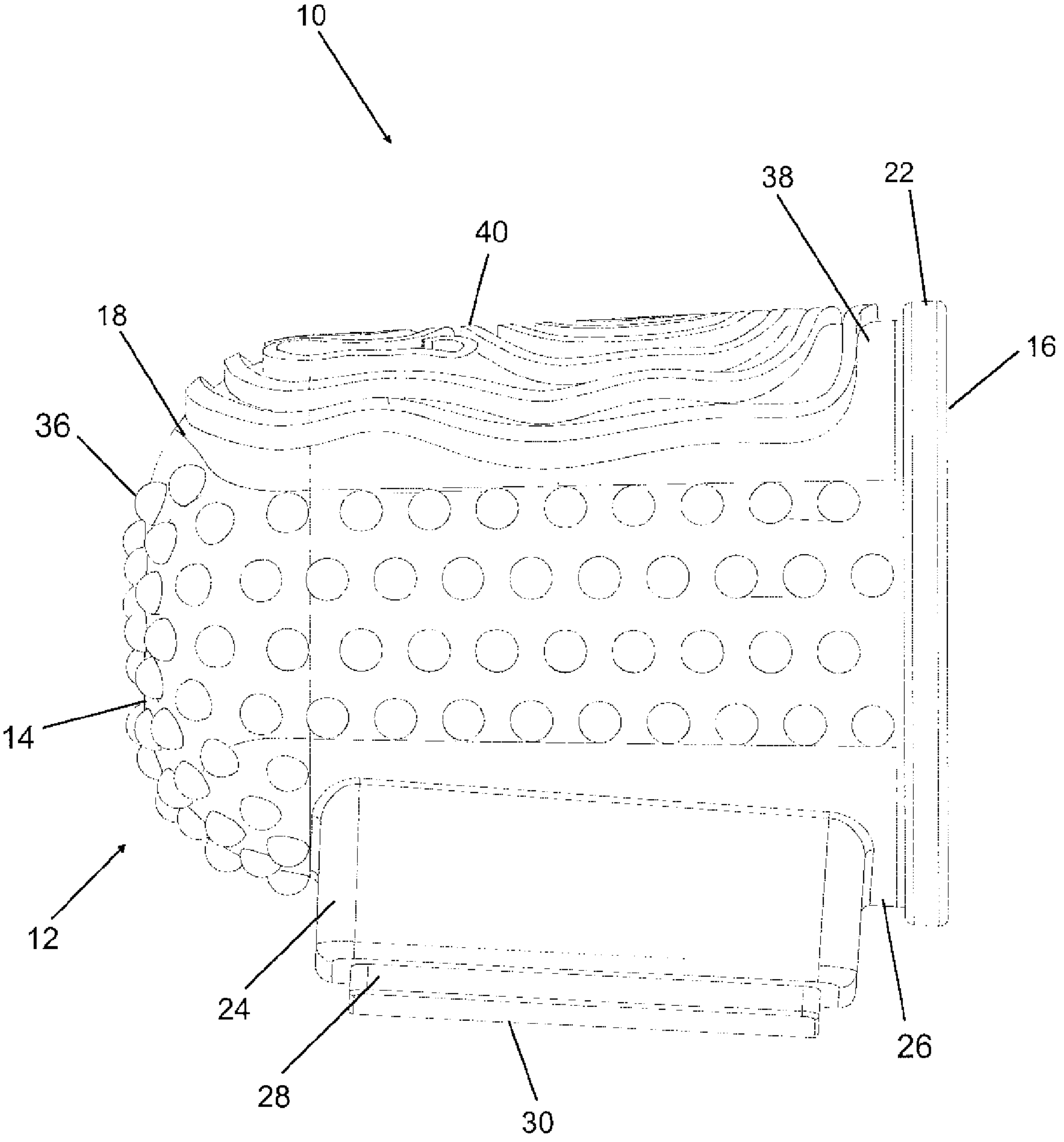
FIG. 3 depicts a side view of the page turning device of FIG. 1.

Referring to FIG. 3, a pad base 24 is positioned on a lower portion 26 of the outer surface 18. The pad base 24 can be a separate unit affixed to the outer surface 18. Alternatively, the finger sleeve 12 and the pad base 24 can be formed of unitary construction, such that the pad base 24 is integrally formed onto the lower portion 26 of the outer surface 18 of the finger sleeve 12.

A pad 28 is positioned on or within the pad base 24, wherein a pad outer surface 30 is tacky or includes a sticky material. The tacky or sticky outer surface 30 permits the pad 28 to temporally bond to a piece of paper, such as a page in a book, allowing the page to be moved from a first position to a section position, i.e., for the turning of the page.

Figure 4:
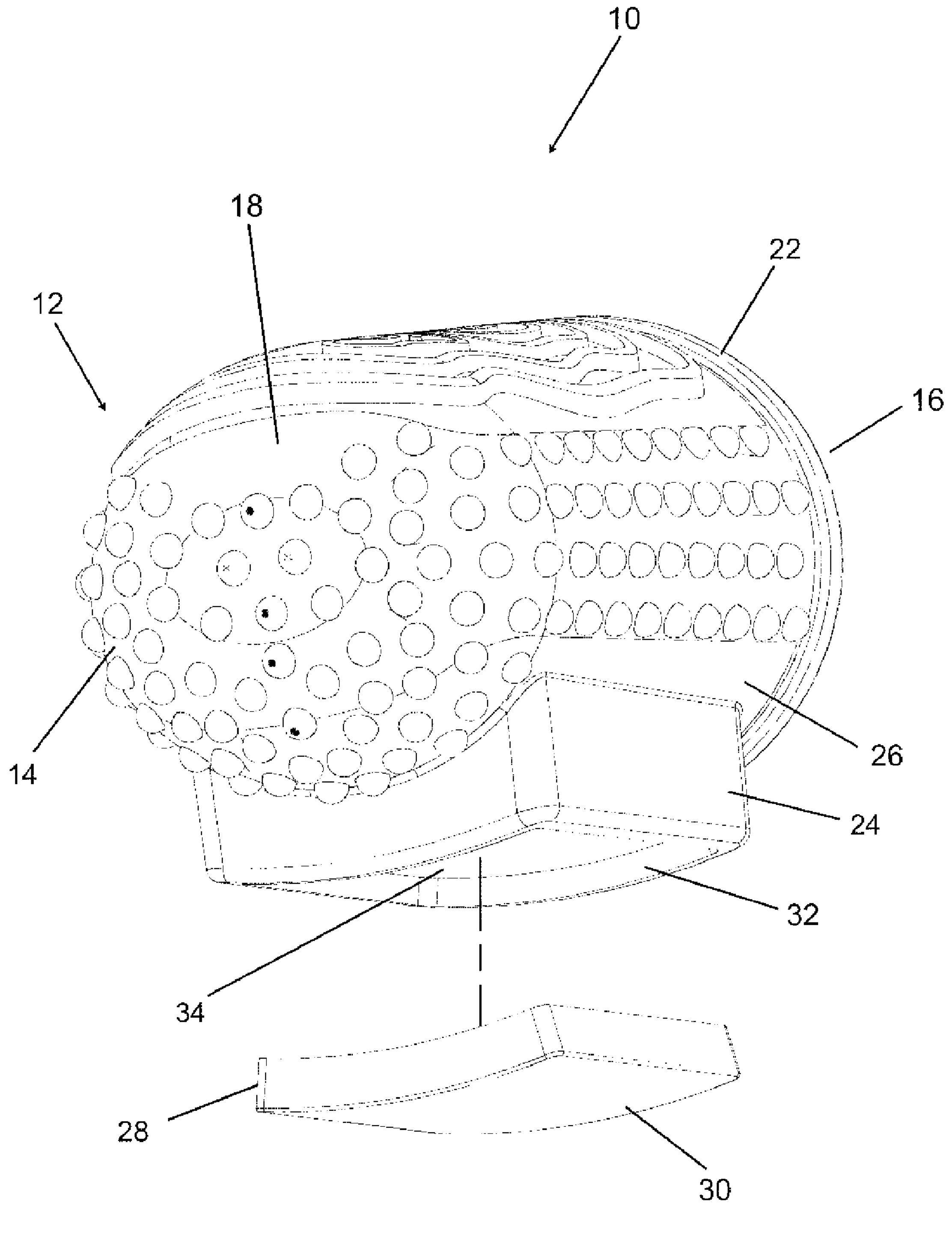
FIG. 4 depicts an exploded view of the page turning device of FIG. 1.

Referring to FIG. 4, the pad housing 24 can include a raised outer edge 32 forming an indented area 34 configured to receive the pad 28. The pad 28 can be permanently affixed into the indented area 34. Alternatively, the pad 28 can be removably affixed into the indented area 34.

Figure 5:
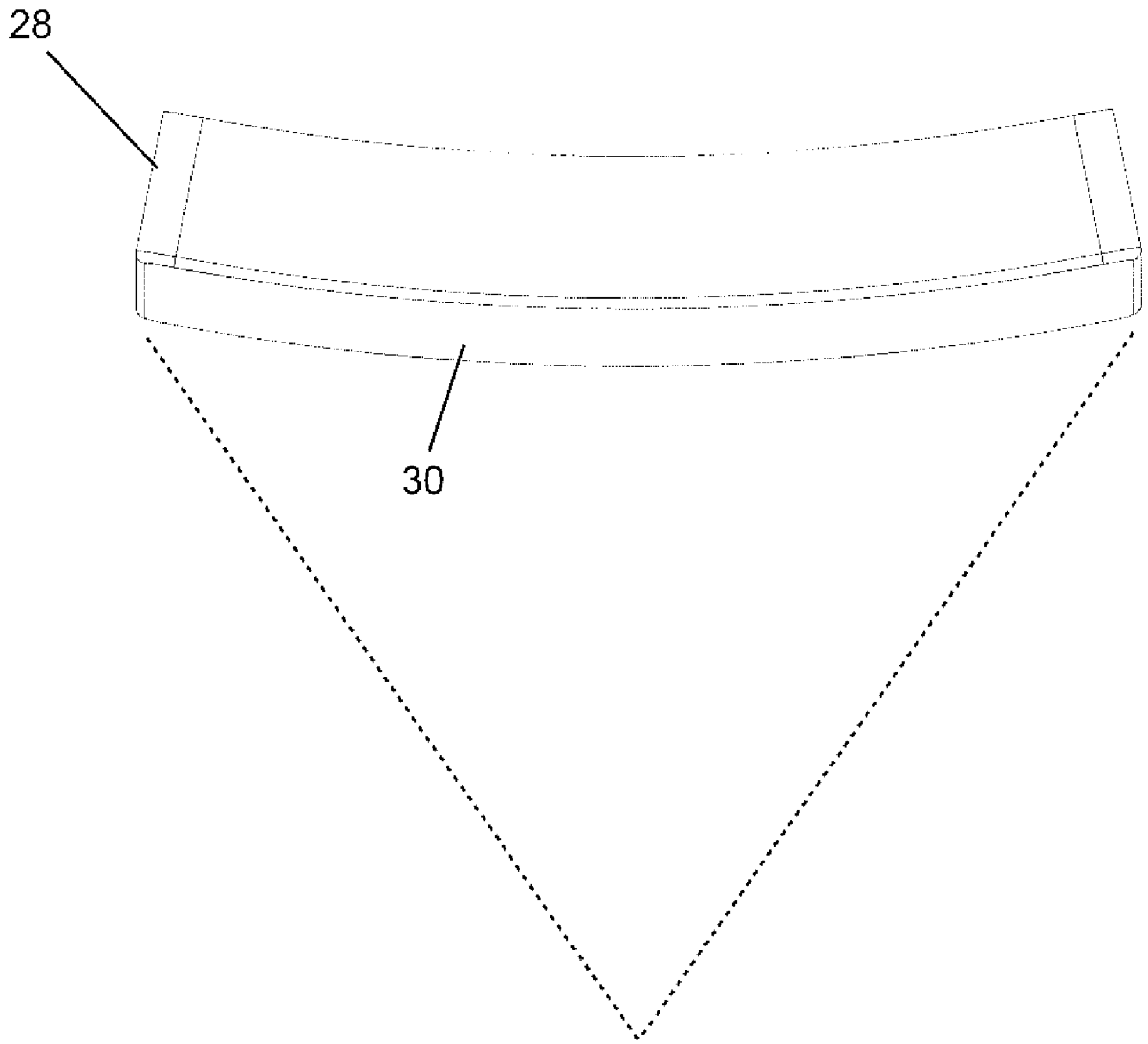
FIG. 5 depicts a front view of a pad for the page turning device of FIG. 1.

Referring to FIG. 5, the pad outer surface 30 can be an arcuate surface. (See also FIG. 2). As an arcuate surface, the pad outer surface 30 can be rolled off of a paper, detaching the page turning device 10 from the paper.

The outer surface 18 of the finger sleeve 12 can be a textured surface. Referring again to FIG. 3, a plurality of projections 36 can be positioned about the outer surface 18. The projections 36 can be used to aid in gripping the finger sleeve 12 for placement on and removal of the page turning device 10 from a finger tip, as well as aiding in the removal of the pad 28 from the paper. In an embodiment, the projections 36 can be nodules, conical, cylindrical, polygonal, elliptical, tubular, and/or rib-shaped projections.

Figure 6:
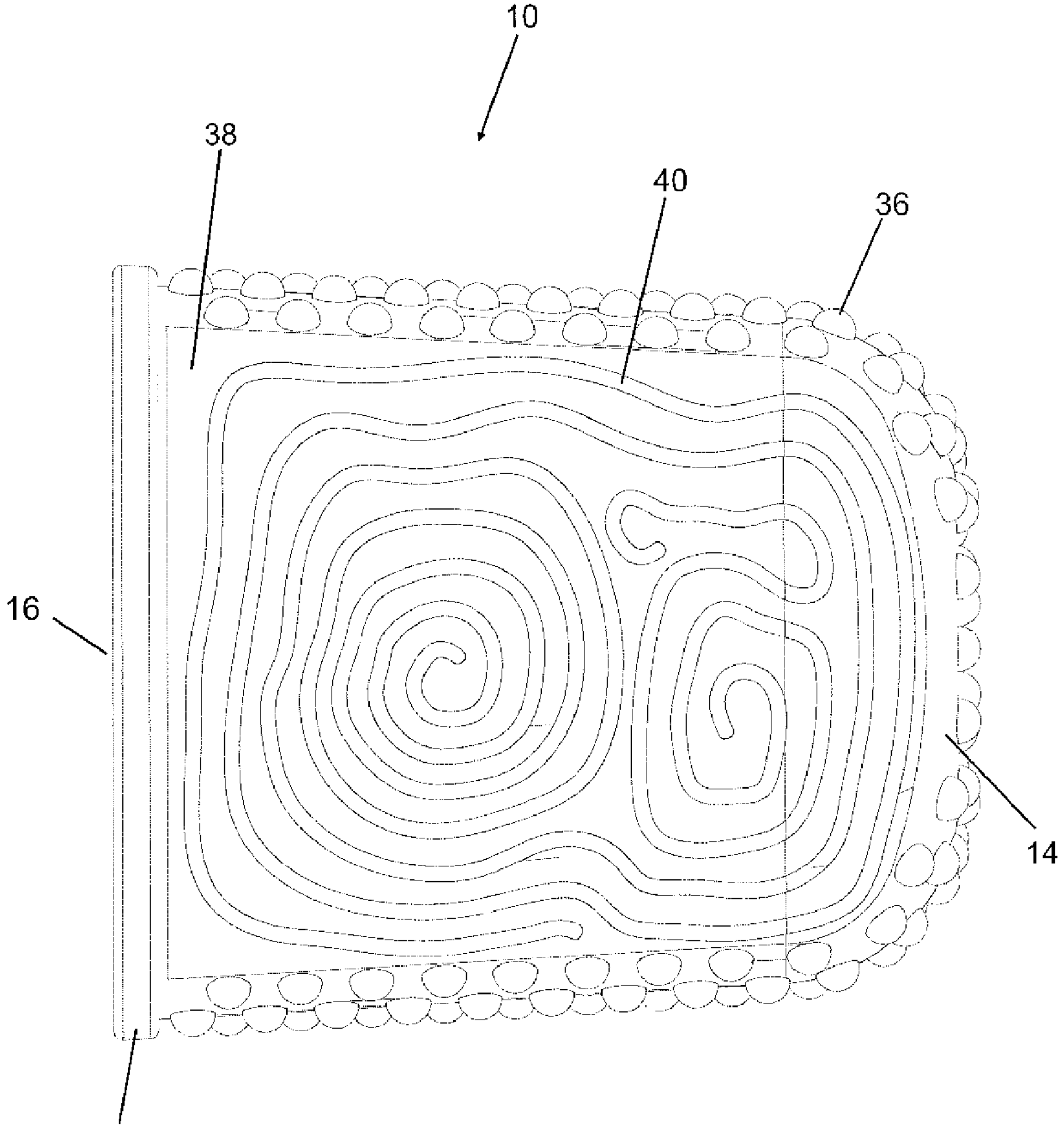
FIG. 6 depicts a top view of the page turning device of FIG. 1.

Referring to also FIG. 6, an upper portion 38 of the outer surface 18 of the finger sleeve 12 can include an alternative texture surface. (See also FIG. 1). The alternative texture surface can take the form of raised ridges 40 arranged in a particular pattern about the upper surface 36. In an embodiment, the raised ridges 40 can be arranged to substantially resemble a finger print. The upper portion 38 of the finger sleeve 12 can further include a plurality of perforations or vent holes extending through the outer and inner surfaces 18 and 20 of the finger sleeve 12 to facilitate airflow to the finger tip and allow perspiration from the finger tip to evaporate.

The finger sleeve 12 of the page turning device 10 can be made of a flexible, elastic material, such as a plastic, rubber, silicone, polymeric material, or urethane material. Additionally, the material of the finger sleeve 12 can be provided in a variety of different colors, where the colors can be used to differentiate the sizes of the page turning device 10, be used for aesthetic purposes, or combinations thereof. The material of the finger sleeve 12 can also be formulated to provide a pleasant aroma, such as, mint, cinnamon, wild flowers and the like.

The pad 28 can be formed using a suitable flexible, elastomeric material substrate such as a plastic material, polyvinyl, polypropylene, polycarbonate, polystyrene, polyester rubber, silicone, polymeric material, or urethane material with a tacky outer surface 30 applied either as a film laminated to the substrate or as a coating from an appropriate composition of ink. The ink is applied to pad outer surface 30 and allowed to cure; the ink being provided with an additive to provide a tacky condition to the pad outer surface 30.

Alternatively, the pad 28 material can be a synthetic plastic material having a high plasticizer content, and therefore having a tacky surface. Polyvinyl chloride (or, as it is more commonly referred to, "PVC") is a versatile and widely used synthetic polymer. In its unmodified form, PVC is rigid and capable of being fabricated into containers, structural components, tubing, etc. When compounded with a plasticizer, PVC can be calendered into flexible sheet material having a tacky surface. This can be cleaned using water to which a detergent has been added.

Similarly, the pad 28 can be made of a thermoplastic elastomer (TPE). In an embodiment, the pad 25 material can be MONPRENE, a registered U.S. Trademark of QST, Inc, which is a versatile family of TPEs composed of saturated styrene block copolymer rubbers and thermoplastic olefin resins. The surface characteristics and feel of MONPRENE elastomers can have a high co-efficient of friction (high tackiness). This can be cleaned using water to which a detergent has been added.

In a method of use, the page turning device 10 is positioned on a finger tip of a wearer. The page turning device 10 is positioned on the finger tip by inserting the finger tip through the open end 16 of the finger sleeve 12, until the finger tip is substantial abutting the inner surface 20 of the closed end 14 of the finger sleeve 10.

As the page turning device 10 is available in a variety of sizes, to accommodate different size finger tips, the size of the page turning device 10 can be selected such that the inner surface 20 of the finger sleeve 12 fits snuggly about the finger tip.

The page turning device 10 is positioned on finger tip, such that the lower portion 26 and the pad 28 are positioned over a lower surface of the finger tip. The tacky outer surface 30 of the pad 38 is used to engage a paper, wherein the tacky outer surface 30 is sufficiently tacky to lift, i.e. turn the paper. To disengage the paper turn device 10 from the paper, the finger is rotated about its longitudinal axis, such that the tacky outer surface 30 of the pad 28 is rolled off of the paper.

In the instance where it is not desirable to use a tacky surface on a paper, the page turning device 10 can be positioned on the finger tip, such that the upper 38 of the finger sleeve 12 and the raised ridges 40 are position over the lower surface on the finger tip. The raised ridges 40 can be used to frictionally engage the paper.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A device worn on the finger of a user, operative to move leaves of material, comprising:

a first surface including a first elastomeric material operative to push a leaf by frictionally engaging the leaf with said elastomeric material;

a second surface including a second sticky material, different from said first elastomeric material, operative to engage a leaf with substantially more force than said first elastomeric material, and further operative to lift as well as push a leaf by bonding to said leaf with said second sticky material;

wherein a user may change a position of the device on the finger to choose between pushing a leaf with said first surface, or pushing or lifting a leaf with said second surface.

2. The device of claim 1, wherein the second material is a plastic material rendered sticky due to a plasticizer content.

3. The device of claim 1, wherein said second surface extends around a portion of said first surface, whereby said second surface may be rotated in connection with the finger, thereby changing an engagement of said leaf from said second area to said first area, whereupon said leaf is released.

4. A device worn on the finger of a user, operative to aid the user to move a sheet, such as paper, currency, or book pages, from a first position to a second position, comprising:

a sleeve including a first elastomeric material operative to push a sheet by frictionally engaging the sheet with said elastomeric material;

a surface disposed upon a portion of said sleeve, said surface including a second sticky material operative to engage a sheet with substantially more friction than said first elastomeric material, and further operative to lift a sheet by bonding to said sheet with said second sticky material;

wherein a user may position the device on the finger to push a sheet with said first surface, or either push or lift a sheet with said second surface.

5. A device worn on the finger of a user, operative to aid the user to move a sheet, such as paper, currency, or book pages, from a first position to a second position, comprising:

a sleeve including a first elastomeric material operative to push a sheet by frictionally engaging the sheet with said elastomeric material;

a surface disposed upon a portion of said sleeve, said surface including a second sticky plastic material, different from said first elastomeric material, rendered sticky by having a high plasticizer content, operative to engage a sheet with substantially more friction than said first elastomeric material, and further operative to lift a sheet by bonding to said sheet with said second sticky plastic material;

wherein a user may position the device on the finger to push a sheet with said first surface, or either push or lift a sheet with said second surface.

6. The device of claim 5, wherein said second sticky plastic material further includes a tacky additive.

7. A device worn on the finger of a user, operative to aid the user to move a sheet, such as paper, currency, or book pages, from a first position to a second position, comprising:

a sleeve including a first elastomeric material operative to push a sheet by frictionally engaging the sheet with said elastomeric material;

a surface disposed upon a portion of said sleeve, said surface including a second sticky plastic material, different from said first elastomeric material, rendered sticky by having a tacky additive, operative to engage a sheet with substantially more friction than said first elastomeric material, and further operative to lift a sheet by bonding to said sheet with said second sticky plastic material;

wherein a user may position the device on the finger to push a sheet with said first surface, or either push or lift a sheet with said second surface.

* * * * *